(12) United States Patent
Koga et al.

(10) Patent No.: US 8,256,317 B2
(45) Date of Patent: Sep. 4, 2012

(54) TRANSMISSION DEVICE AND POWER SEAT SLIDE DEVICE FOR VEHICLE

(75) Inventors: Yoshitaka Koga, Chiryu (JP); Hirokazu Suzumura, Aichi-gun (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 671 days.

(21) Appl. No.: 12/514,332

(22) PCT Filed: Jan. 15, 2008

(86) PCT No.: PCT/JP2008/050377
§ 371 (c)(1),
(2), (4) Date: May 11, 2009

(87) PCT Pub. No.: WO2008/087947
PCT Pub. Date: Jul. 24, 2008

(65) Prior Publication Data
US 2010/0013284 A1 Jan. 21, 2010

(30) Foreign Application Priority Data

Jan. 19, 2007 (JP) .................................. 2007-010363

(51) Int. Cl.
*F16H 1/16* (2006.01)
*F16H 57/04* (2010.01)
(52) U.S. Cl. ..................... 74/425; 74/606 R; 297/362.14
(58) Field of Classification Search ................ 74/89.23, 74/425, 606 R, 89.14, 89.34; 297/362, 362.11, 297/362.12, 362.14, 344.11
See application file for complete search history.

(56) References Cited

U.S. PATENT DOCUMENTS

| 4,892,490 A * | 1/1990 | Tsuchiya et al. .............. 439/533 |
| 6,032,550 A | 3/2000 | Rugh |
| 6,190,194 B1 | 2/2001 | Kubota |

(Continued)

FOREIGN PATENT DOCUMENTS

JP 52 46174 4/1977

(Continued)

OTHER PUBLICATIONS

Japanese Office Action issued Nov. 15, 2011 in patent application No. 2008-554041 with English translation.

*Primary Examiner* — Thomas R Hannon
*Assistant Examiner* — Phillip A Johnson
(74) *Attorney, Agent, or Firm* — Oblon, Spivak, McClelland, Maier & Neustadt, L.L.P.

(57) ABSTRACT

A transmission device that transmits rotation of a drive cable to a screw shaft is provided. The transmission device includes a worm gear attached to the drive cable, a helical gear attached to the screw shaft, a gear case, a pair of first bearing wall portions, and a pair of second bearing wall portions. The gear case has an opening on one side so as to accommodate the worm gear and the helical gear. The first bearing wall portions are integrally formed with the gear case so as to face each other along the axial direction of the drive cable, and rotatably support both ends of the worm gear. The second bearing wall portions are integrally formed with the gear case so as to face each other along the axial direction of the screw shaft, and rotatably support both ends of the helical gear.

16 Claims, 7 Drawing Sheets

U.S. PATENT DOCUMENTS

| | | | |
|---|---|---|---|
| 7,802,487 B2 * | 9/2010 | Knopfle et al. | 74/89.14 |
| 2003/0084874 A1 * | 5/2003 | Rauch et al. | 123/399 |
| 2006/0213302 A1 | 9/2006 | Hoffmann et al. | |

FOREIGN PATENT DOCUMENTS

| | | |
|---|---|---|
| JP | 56 14246 | 2/1981 |
| JP | 60-151731 | 10/1985 |
| JP | 2 84181 | 6/1990 |
| JP | 10 315803 | 12/1998 |
| JP | 2000 16127 | 1/2000 |
| JP | 2000 120845 | 4/2000 |
| JP | 2003 56520 | 2/2003 |
| JP | 2003 343701 | 12/2003 |
| WO | 2005 015054 | 2/2005 |

* cited by examiner

TRANSMISSION DEVICE AND POWER SEAT SLIDE DEVICE FOR VEHICLE

FIELD OF THE INVENTION

The present invention relates to a transmission device and a power seat slide device for a vehicle.

BACKGROUND OF THE INVENTION

Various types of transmission devices have been developed that transmits rotation of a drive shaft to a driven shaft that has an axis extending along a direction different from the axis of the drive shaft. Such a transmission device transmits rotation by meshing a worm gear attached to a drive shaft and a helical gear attached to a driven shaft, and includes a support member to rotatably accommodate the worm gear and the helical gear.

Patent Document 1 discloses a transmission device that includes four bearing portions each supports one of the ends of a worm gear and the ends of a helical gear. The bearing portions are formed by dividing a support member into four pieces.

However, in the transmission device disclosed in Patent Document 1, the positional accuracy of the bearing portions, or the positional accuracy of each of the parts obtained by dividing the support member into four pieces, affects the meshing of the worm gear and the helical gear. That is, if the positional accuracy of the parts is reduced when assembling the four bearing portions, noise may be generated between the meshing worm gear and helical gear. It is therefore necessary to ensure the positional accuracy of the bearing portions.

Patent Document 2 discloses a gear housing serving as a support member that integrally includes four bearing portions each supporting one of the ends of worm gear and the ends of the helical gear. However, since the gear housing is shaped like a box, the drive shaft and the drive shaft each need to be moved along the axial direction when being assembled. This makes the assembly of the worm gear and the helical gear burdensome.

[Patent Document 1] Pamphlet of International Patent Publication 2005/015054 A1
[Patent Document 2] Japanese Laid-Open Patent Publication No. 2000-16127

SUMMARY OF THE INVENTION

Accordingly, it is an objective of the present invention to provide a transmission device and a power seat slide device for a vehicle that are easy to install and reliably ensure the positional accuracy of bearing portions supporting a worm gear and a helical gear.

To achieve the foregoing objective and in accordance with a first aspect of the present invention, a transmission device that transmits rotation of a drive shaft to a driven shaft that has an axis extending along a direction different from the axis of the drive shaft is provided. The transmission device includes a worm gear, a helical gear, a holding member, a pair of first bearing portions, and a pair of second bearing portions. The worm gear is attached to the drive shaft. The helical gear is attached to the driven shaft. The holding member has an opening on one side so as to accommodate the worm gear and the helical gear. The first bearing portions are integrally formed with the holding member so as to face each other along the axial direction of the drive shaft, and rotatably support both ends of the worm gear. The second bearing portions are integrally formed with the holding member so as to face each other along the axial direction of the driven shaft, and rotatably support both ends of the helical gear.

In accordance with a second aspect of the present invention, a power seat slide device for a vehicle that includes a first rail, a second rail, a screw shaft, a nut member, a drive shaft, a transmission device is provided. The first rail is fixed to the floor of the vehicle. The second rail is supported to be slidable on the first rail. The screw shaft is supported by one of the first and second rails to be rotatable and immovable in the axial direction. The screw shaft has an axis extending along the sliding direction of the second rail. The nut member is fixed to the other one of the first and second rails, and is threaded to the screw shaft. The drive shaft has an axis that extends in a direction different from the direction of the axis of the screw shaft. The transmission device is supported on one of the rails that supports the screw shaft, and transmits rotation of the drive shaft to the screw shaft. The transmission device includes a worm gear, a helical gear, a holding member, a covering member, a pair of first bearing portions, and a pair of second bearing portions. The worm gear is attached to the drive shaft. The helical gear is attached to the screw shaft, and is meshed with the worm gear. The holding member has an opening on one side so as to accommodate the worm gear and the helical gear. The covering member is attached to the holding member from one side of the holding member thereby covering the opening of the holding member. The first bearing portions are integrally formed with the holding member so as to face each other along the axial direction of the drive shaft, and rotatably support both ends of the worm gear. The second bearing portions are integrally formed with one of the holding member and the covering member so as to face each other along the axial direction of the screw shaft, and rotatably support both ends of the helical gear.

DETAILED DESCRIPTION OF THE PREFERRED EMBODIMENTS

Hereinafter, a seat 1 according to a first embodiment of the present invention will be described with reference to the drawings. The seat 1 is mounted on a vehicle such as an automobile. In the following description, the terms "front", "rear", "left", "right", "top", and "bottom" are defined in relation to the seat 1.

Figure 1:
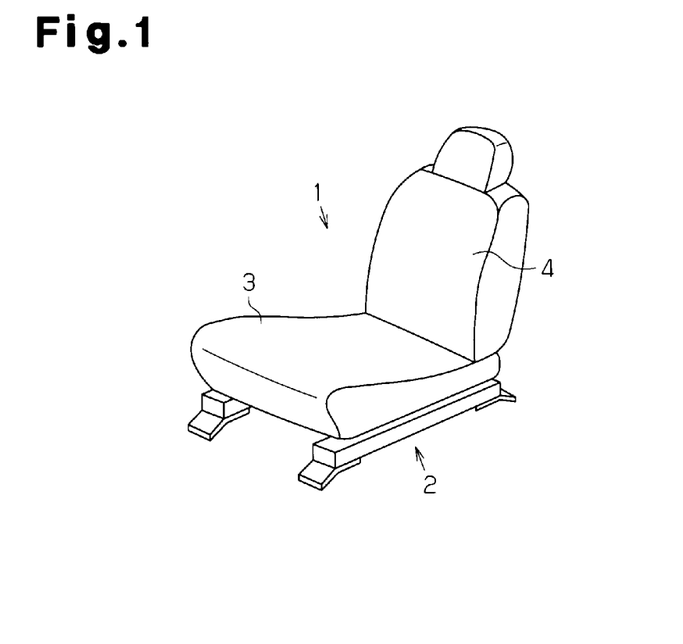
FIG. 1 is a perspective view illustrating a vehicle seat that is actuated by a seat slide mechanism according to a first embodiment of the present invention.

FIG. 1 is a perspective view of the seat 1. As shown in FIG. 1, the seat 1 includes a seat cushion 3 and a seat back 4. The seat cushion 3 is supported to the floor of a vehicle with a seat slide mechanism 2, so as to be slidable in the front-rear direction, and the seat back 4 is supported by the rear end of the seat cushion 3.

The seat slide mechanism 2 will now be described.

Figure 2:
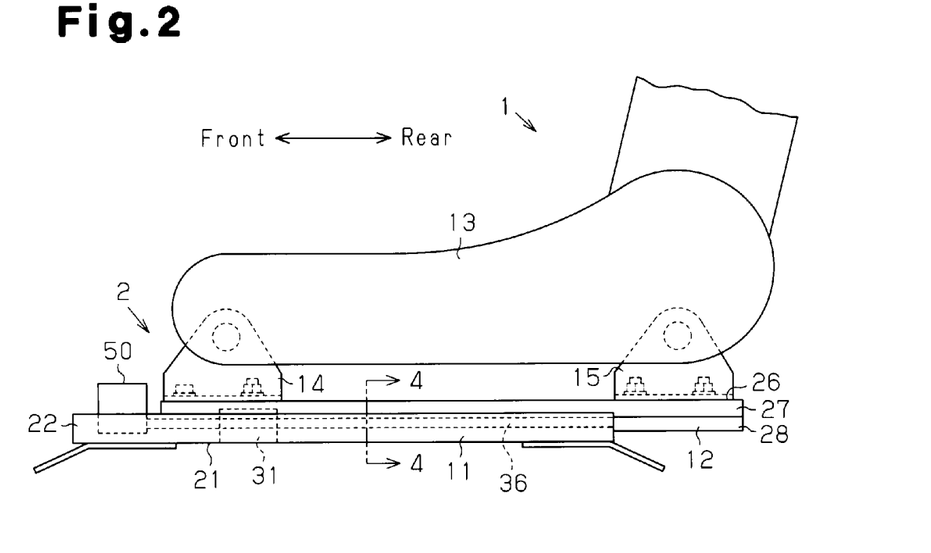
FIG. 2 is a side view of the seat slide mechanism shown in FIG. 1.
Figure 3:
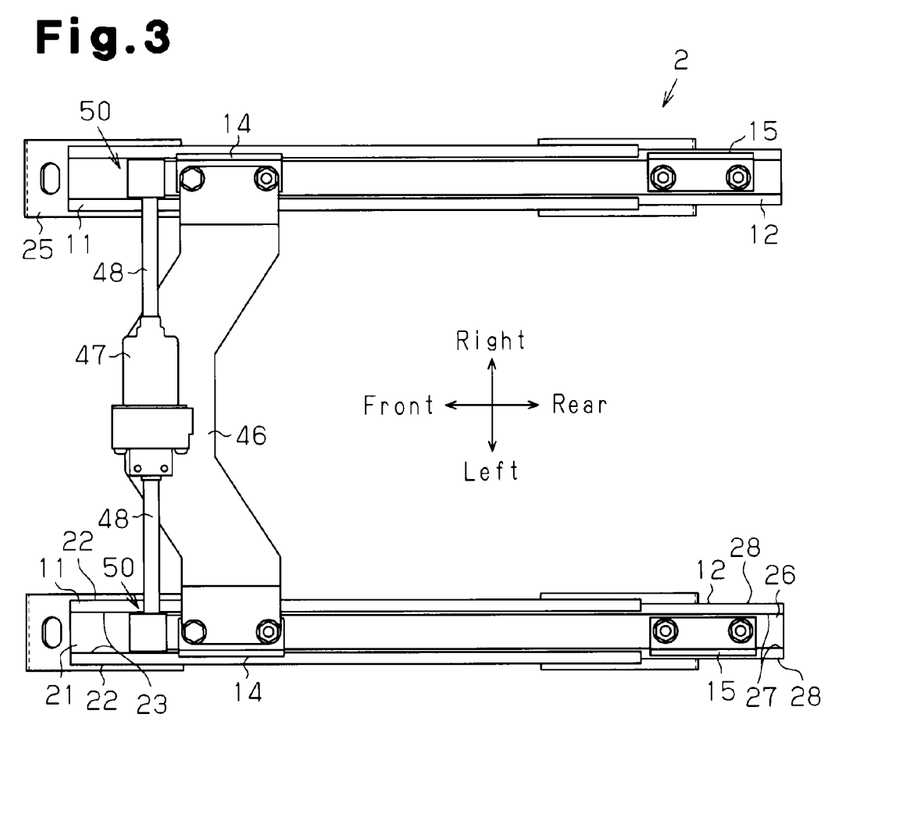
FIG. 3 is a plan view of the seat slide mechanism shown in FIG. 1.
Figure 4:
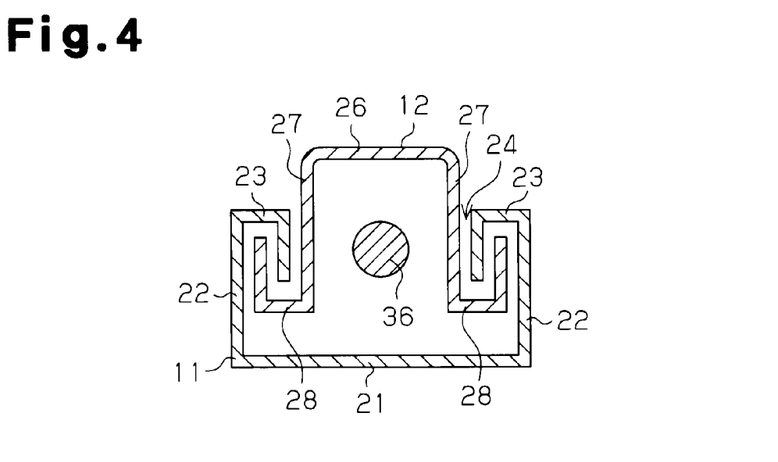
FIG. 4 is a cross-sectional view taken along line 4-4 of FIG. 2.

FIG. 2 is a side view of the seat slide mechanism 2, FIG. 3 is a plan view of the seat slide mechanism 2, and FIG. 4 is a cross-sectional view taken along line 4-4 of FIG. 2. As shown in FIG. 2, a pair of elongated first rails are provided at both sides of the seat 1 in the left-right direction. In this embodiment, the first rails are lower rails 11, which are fixed to the vehicle floor so as to extend along the front-rear direction. A pair of left and right elongated second rails are provided on the lower rails 11. In this embodiment, the second rails are upper rails 12, which are attached to the lower rails 11 so as to be slidable in the front-rear direction.

A lower arm 13 is supported above each upper rail 12 by means of a pair of front and rear brackets 14, 15. The lower arms 13 serve as frameworks of the seat cushion 3, and the upper rails 12 support the seat cushion 3 with the lower arms 13 in between. The position of the seat cushion 3 on the vehicle floor is adjusted by sliding the upper rails 12 on the lower rails 11.

More specifically, each lower rail 11 has a U-shaped cross section with a bottom wall portion 21, a pair of side wall portions 22 extending upward from ends of the bottom wall portion 21 in the widthwise direction (left-right direction), and folded-back wall portions 23. Each folded-back wall portion 23 is folded inward with respect to the widthwise direction from the upper end of the corresponding side wall portion 22 and then bent toward the bottom wall portion 21. An upward opening 24 is formed between the folded-back wall portions 23 of each lower rail 11.

On the other hand, each upper rail 12 has a substantially inverted U-shaped cross section with a top wall portion 26, a pair of side wall portions 27 extending downward from ends of the top wall portion 26 in the widthwise direction (left-right direction), and folded-back wall portions 28. Each folded-back wall portion 28 is folded outward with respect to the widthwise direction from the lower end of the corresponding side wall portion 27 and then bent upward. Each folded-back wall portion 28 is encompassed by the corresponding side wall portion 22 and the corresponding folded-back wall portion 23. Each upper rail 12 is supported by the corresponding lower rail 11 so as to be slidable in the front-rear direction by means of a sliding member (not shown) accommodated in a space defined by the side wall portions 22 of the lower rail 11 and the folded-back wall portions 28 of the upper rail 12. As shown in FIG. 2, the brackets 14, 15 are attached to the front and rear ends of the top wall portion 26 of each upper rail 12.

As shown in FIG. 2, a resin nut member 31 shaped as a rectangular parallelepiped is fixed to the bottom wall portion 21 of each lower rail 11. The nut member 31 has a through thread portion (internal thread) extending in the front-rear direction.

Figure 5:
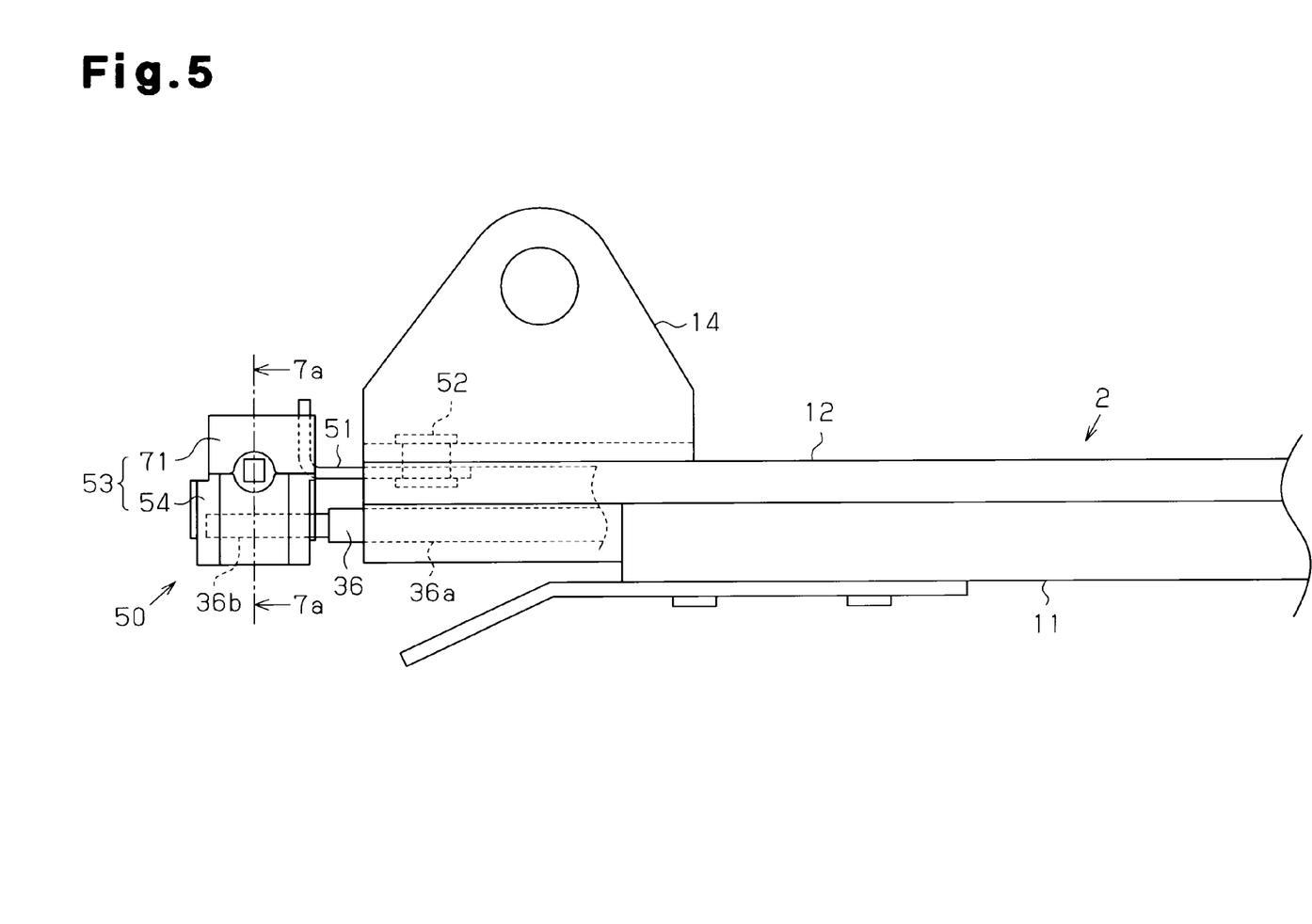
FIG. 5 is a partially enlarged view of FIG. 2.

A driven shaft, which is a screw shaft 36 is arranged between each lower rail 11 and the corresponding upper rail 12. The screw shaft 36 is made of a metal rod having a circular cross section and extends in the front-rear direction, or along the direction in which the upper rail 12 slides. FIG. 5 is a partially enlarged view of FIG. 2. As shown in FIG. 5, the screw shaft 36 has a thread portion (external thread) 36a threaded with the thread portion of the nut member 31, and a quadrangular prism-like shaft-side fitted portion 36b continuously formed with the front end of the thread portion 36a. The front end of the screw shaft 36 (part including the shaft-side fitted portion 36b) protrudes forward from the front end of the upper rail 12.

The screw shaft 36 is supported by the upper rail 12 to be rotatable and immovable in the axial direction. The configuration with which the screw shaft 36 is supported to the upper rail 12 is not illustrated. Therefore, when the screw shaft 36 rotates relative to the nut member 31, the screw shaft 36 moves integrally with the upper rail 12 in the front-rear direction relative to the nut member 31.

As shown in FIG. 3, the pair of upper rails 12 are connected at front ends to a coupler bracket 46 extending in the left-right direction. A motor 47 is attached to a center portion of the coupler bracket 46 in the longitudinal direction. A pair of drive shafts, which are drive cables 48 extending leftward and rightward, are operatively coupled to the motor 47. Each drive cable 48 is operatively coupled to the corresponding screw shaft 36 by means of a transmission mechanism fixed to the front end of the corresponding upper rail 12. In this embodiment, the transmission mechanism is a gearbox 50. Therefore, when the motor 47 is rotated by receiving electricity from a power supply unit (not shown), the rotation is transmitted to the screw shafts 36 through the drive cables 48 and the gearboxes 50.

Figure 6:
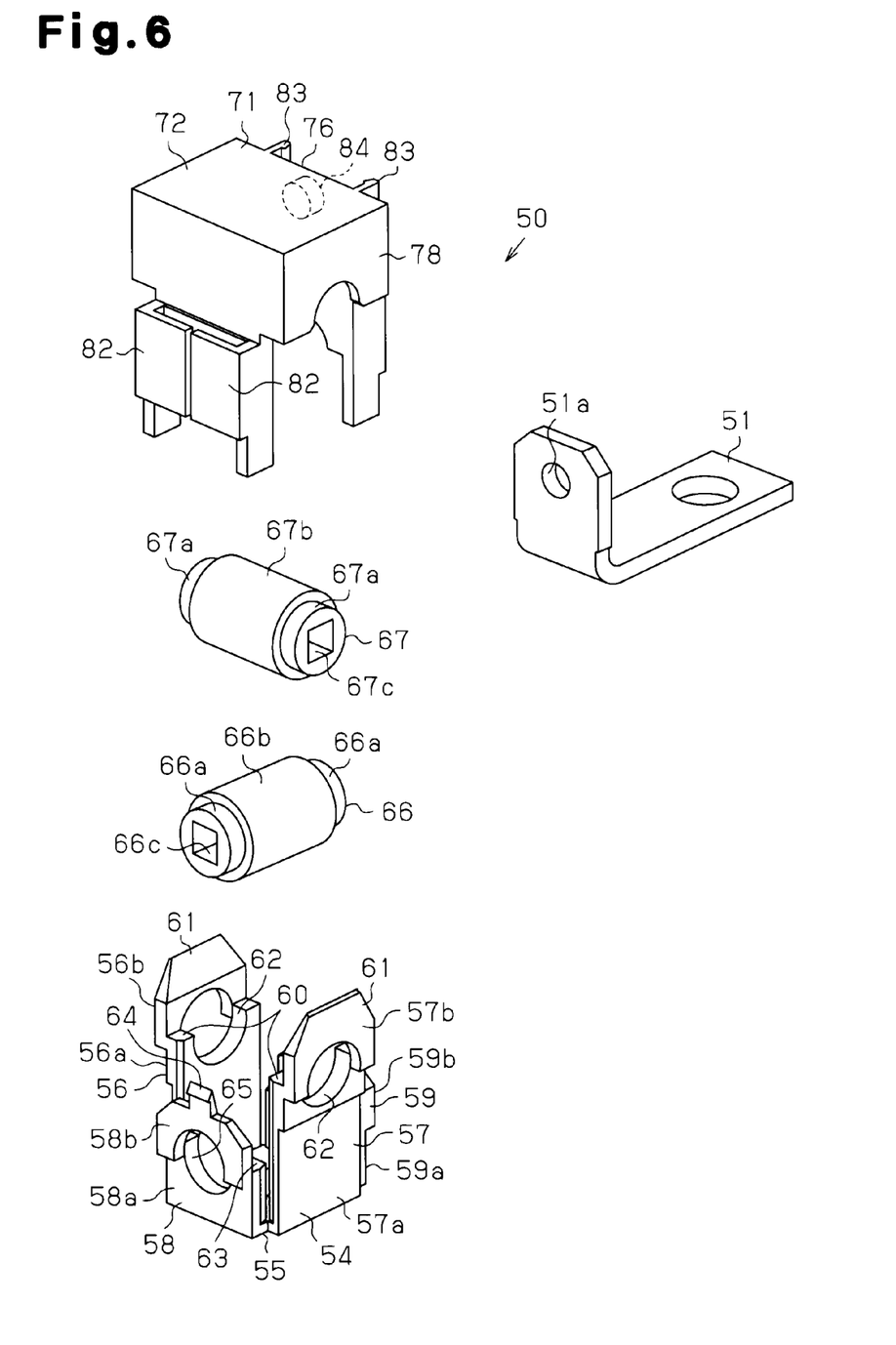
FIG. 6 is an exploded perspective view illustrating the gearbox in the seat slide mechanism shown in FIG. 1.
Figure 7A:
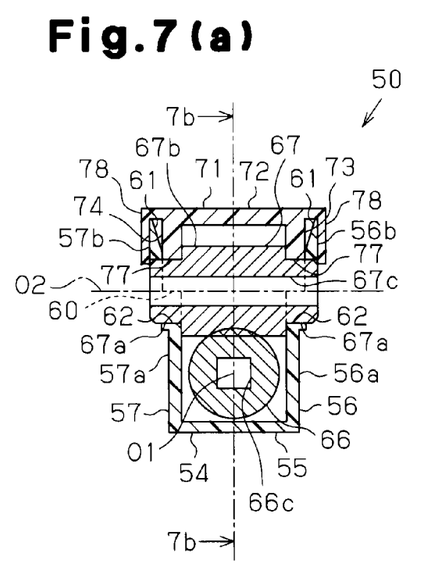
FIG. 7(a) is a cross-sectional view taken along line 7a-7a of FIG. 5.

The structure of each gearbox 50 will now be described with reference to FIGS. 6 and 7. FIG. 6 is an exploded perspective view of the gearbox 50. FIG. 7(a) is a cross-sectional view taken along line 7a-7a of FIG. 5, and FIG. 7(b) is a cross-sectional view taken along line 7b-7b of FIG. 7(a).

As shown in FIG. 5, an L-shaped bracket 51 made of a plate is fixed to the lower surface of the front end of each upper rail 12, more specifically, to the lower surface of a part of the upper rail 12 (the top wall portion 26) that is forward of the nut member 31. A gear housing 53, which is the outer shell of the gearbox 50, is held at a front portion of the each bracket 51, which is bent upward.

As shown in FIG. 6, the gear housing 53 includes a holding member made of a resin material, which is a gear case 54. The gear case 54 has a rectangular bottom wall portion 55, a pair of first bearing portions, and a second bearing portions. The first bearing portions are first bearing wall portions 56, 57, which extend perpendicularly from the bottom wall portion 55 and face each other in the widthwise direction (left-right direction). The second bearing portions are second bearing wall portions 58, 59, which extend perpendicularly from the bottom wall portion 55 and face each other in the front-rear direction. The gear case 54 is formed like a box with an upper opening by integrating the bottom wall portion 55, and the first and second bearing wall portions 56 to 59. The first and the second bearing wall portions 56 to 59 are separated from one another while being supported by the bottom wall portion 55 in a cantilever-like manner. The amount by which the first bearing wall portions 56, 57 project from the bottom wall portion 55 is longer than that of the second bearing wall portions 58, 59, and the direction along which the first bearing wall portions 56, 57 face each other is perpendicular to the direction in which the second bearing wall portions 58, 59 face each other.

The first bearing wall portions 56, 57 have steps 60, first proximal wall portions 56a, 57a closer to the proximal ends than the steps 60, and first distal wall portions 56b, 57b closer to the distal ends than the steps 60. The space between the first distal wall portions 56b, 57b is greater than the space between the first proximal wall portions 56a, 57a. A sharp guide piece 61 is provided at the distal end of each of the first distal wall portions 56b, 57b. The positions of the first proximal wall portions 56a, 57a are offset from the positions of the first distal wall portions 56b, 57b at the steps 60 to allow the molds for forming the gear case 54 to be opened in the up-down direction.

A circular first bearing surface 62 is formed at a position in each of the first bearing wall portions 56, 57 that corresponds to the step 60. The central axis of the first bearing surface 62 coincides with the axis of the drive cables 48 when the gearbox 50 is held by the upper rail 12 with the bracket 51.

The second bearing wall portions 58, 59 have steps 63 located below the first bearing surfaces 62, second proximal wall portions 58a, 59a closer to the proximal ends than the steps 63, and second distal wall portions 58b, 59b closer to the distal ends than the steps 63. The space between the second distal wall portions 58b, 59b is greater than the space between the second proximal wall portions 58a, 59a. Further, a hook, which is an coupling hook 64, extends upward from a widthwise center of each of the second distal wall portions 58b, 59b. The positions of the second proximal wall portions 58a, 59a are offset from the positions of the second distal wall portions 58b, 59b at the steps 63 to allow the molds for forming the gear case 54 to be opened in the up-down direction.

A circular second bearing surface 65 is formed at a position of each of the second bearing wall portions 58, 59 that corresponds to the step 63. The central axis of the second bearing surface 65 coincides with the axis of the screw shaft 36 when the gearbox 50 is held by the upper rail 12 with the bracket 51.

The second bearing wall portions 58, 59 rotatably support a helical gear 66. As shown in FIG. 7(b), the axial length of the helical gear 66 is equal to the distance between the outer surface of the second distal wall portion 58b and the outer surface of the second distal wall portion 59b. A columnar shaft portion 66a is provided at either end of the helical gear 66. Each shaft portion 66a has an outer diameter equivalent to the inner diameter of the second bearing surface 65 and slidably contacts the second bearing surface 65. The helical gear 66 has a gear portion 66b located between the shaft portions 66a, and the gear portion 66b is located between the second proximal wall portions 58a, 59a. Each end surface of the helical gear 66 is flush with the outer surface of the corresponding one of the second distal wall portions 58b, 59b.

The helical gear 66 has a fit hole 66c extending therethrough in the axial direction. The fit hole 66c has a square cross section. When the helical gear 66 is supported by the second bearing wall portions 58, 59, the fit hole 66c coincides with the central axis of the second bearing surfaces 65, or with the axis of the screw shaft 36. The shaft-side fitted portion 36b (refer to FIG. 5) is fitted to the fit hole 66c. Thus, the screw shaft 36 and the helical gear 66 are coupled to rotate integrally. Needless to say, the axis O1 of the helical gear 66 coincides with the central axis of the second bearing surfaces 65.

The first bearing wall portions 56, 57 rotatably support a worm gear 67. As shown in FIG. 7(a), the axial length of the worm gear 67 is equal to the distance between the outer surface of the first distal wall portion 56b and the outer surface of the first distal wall portion 57b. A columnar shaft portion 67a is provided at either end of the worm gear 67. Each shaft portion 67a has an outer diameter equivalent to the inner diameter of the first bearing surface 62 and slidably contacts the first bearing surface 62. The worm gear 67 has a gear portion 67b located between the shaft portions 67a, and the gear portion 67b is located between the first proximal wall portions 56a, 57a. Each end surface of the worm gear 67 is flush with the outer surface of the corresponding one of the first distal wall portions 56b, 57b.

The worm gear 67 has a fit hole 67c extending therethrough in the axial direction. The fit hole 67c has a square cross section. When the worm gear 67 is supported by the first bearing wall portions 56, 57, the fit hole 67c coincides with the central axis of the first bearing surfaces 62, or with the axis of the drive cables 48. The distal end of the drive cable 48 is fitted to the fit hole 67c. Thus, each drive cable 48 and the corresponding worm gear 67 are coupled to rotate integrally. Needless to say, the axis O2 of the worm gear 67 coincides with the central axis of the first bearing surfaces 62. The worm gear 67 is meshed with the helical gear 66. The helix angle between the gear portion 66b of the helical gear 66 and the gear portion 67b of the worm gear 67 is defined such that the axis O1 of the helical gear 66 and the axis O2 of the worm gear 67 form an angle of 90° when assembled with the gear case 54 (the gear housing 53).

Figure 7B:
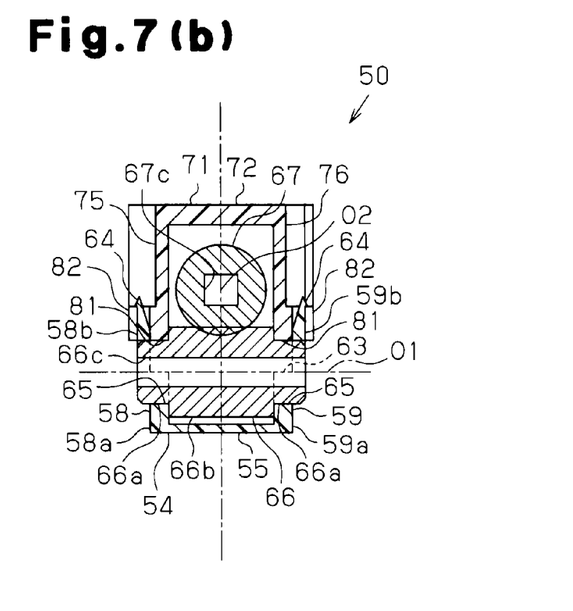
FIG. 7(b) is a cross-sectional view taken along line 7b-7b of FIG. 7(a)

As shown in FIG. 7(a) and FIG. 7(b), a resin covering member, which is a gear cover 71, is attached to the gear case 54 to form the gear housing 53 together with the gear case 54. The gear cover 71 has a rectangular top wall portion 72, a pair of first holding wall portions 73, 74, and a pair of second holding wall portions 75, 76. The first holding wall portions 73, 74 extend perpendicularly from the top wall portion 72 and face each other in the widthwise direction. The second holding wall portions 75, 76 extend perpendicularly from the top wall portion 72 and face each other in the front-rear direction. The gear cover 71 is formed like a lid with a lower opening by integrating the top wall portion 72, and the first and second holding wall portions 73 to 76. The amount by which the first holding wall portions 73, 74 project from the top wall portion 72 is shorter than that of the second holding wall portions 75, 76, and the direction along which the first holding wall portions 73, 74 face each other is perpendicular to the direction in which the second holding wall portions 75, 76 face each other.

When the gear cover 71 is attached to the gear case 54, the distal surfaces of the first holding wall portions 73, 74 face the steps 60 as shown in FIG. 7(a). In this state, the inner surface of each of the first holding wall portions 73, 74 is flush with the inner surface of the corresponding one of the first proximal wall portions 56a, 57a, and the outer surface of each of the first holding wall portions 73, 74 is flush with the inner surface of the corresponding one of the first distal wall portions 56b, 57b. A semicircular first holding surface 77 is formed in each of the first holding wall portions 73, 74 at a position that corresponds to the step 60. When the gear cover 71 is attached to the gear case 54, the first holding surfaces 77 rotatably support the upper half of the shaft portions 67a at positions inside the first distal wall portions 56b, 57b. Thus, the shaft portions 67a of the worm gear 67 are rotatably supported over the entire circumference at proximal positions close to the gear portion 67b.

The top wall portion 72 has a pair of perpendicular guide wall portions 78, which extend along the first holding wall portions 73, 74 at positions outside the first holding wall portions 73, 74. By inserting the first distal wall portions 56b, 57b (the guide pieces 61) between the guide wall portions 78 and the first holding wall portions 73, 74, the attachment of the gear cover 71 to the gear case 54 is guided.

On the other hand, when the gear cover 71 is attached to the gear case 54, the distal surfaces of the second holding wall portions 75, 76 face the steps 63 as shown in FIG. 7(b). In this state, the inner surface of each of the second holding wall portions 75, 76 is flush with the inner surface of the corresponding one of the second proximal wall portions 58a, 59a, and the outer surface of each of the second holding wall portions 75, 76 is flush with the inner surface of the corresponding one of the second distal wall portions 58b, 59b. A semicircular second holding surface 81 is formed in each of the second holding wall portions 75, 76 at a position that corresponds to the step 63. When the gear cover 71 is attached to the gear case 54, the second holding surfaces 81 rotatably support the upper half of the shaft portions 66a at positions inside the second distal wall portions 58b, 59b. Thus, the shaft portions 66a of the helical gear 66 are rotatably supported over the entire circumference at proximal positions close to the gear portion 66b.

As shown in FIG. 6, a pair of engaging portions, which are engaging wall portions 82, are formed at distal ends of the second holding wall portions 75, 76. The engaging wall portions 82 are formed by folding back the second holding wall portions 75, 76 toward each other from the widthwise ends. The second distal wall portion 58b is inserted between the engaging wall portions 82 and the second holding wall portions 75, and the second distal wall portion 59b is inserted between the engaging wall portions 82 and the second holding wall portion 76, so that the coupling hooks 64 are engaged to the upper ends of the engaging wall portions 82. As a result, the gear cover 71 is fixed so as not to come off the gear case 54.

At this time, the first distal wall portions 56b, 57b are held between the first holding wall portions 73, 74 and the guide wall portions 78, and the second distal wall portions 58b, 59b are held between the second holding wall portions 75, 76 and the engaging wall portions 82. Accordingly, the first distal wall portions 56b, 57b (the first bearing wall portions 56, 57) are prevented from being deformed along the axis of the worm gear 67, and the second distal wall portions 58b, 59b (the second bearing wall portions 58, 59) are prevented from being deformed along the axis of the helical gear 66.

Also, as shown in FIG. 6, the second holding wall portion 76 has a pair of hook claws 83 and a cylindrical positioning portion 84 (projection). The hook claws 83 are located with a space equivalent to the width of the bracket 51, and project rearward. The positioning portion 84 projects rearward at a middle portion between the hook claws 83. The position of the gear cover 71 is determined by inserting the positioning portion 84 into an attachment hole 51a (recess) formed in the bracket 51, and fixed to the bracket 51 by engaging the hook claws 83 to the distal portion of the bracket 51.

The operation of the present embodiment will now be described. When the motor 47 is rotated by receiving electricity from the power supply unit (not shown), the rotation is transmitted to the worm gear 67 through the drive cables 48. Accordingly, the rotation is transmitted to the helical gear 66, which is meshed with the worm gear 67, as shown in FIGS. 7(a) and 7(b). At this time, the rotation of the worm gear 67 about the axis O2 extending in the left-right direction is converted into rotation of the helical gear 66 about the axis O1 extending in the front-rear direction.

The rotation of the helical gear 66 is transmitted to the screw shaft 36, which is couple to the helical gear 66. When the screw shaft 36 rotates relative to the nut member 31, the screw shaft 36 moves integrally with the upper rail 12 in the front-rear direction relative to the nut member 31.

Accordingly, the upper rails 12 are slid in the front-rear direction on the lower rails 11, so that the position of the seat cushion 3 on the vehicle floor is adjusted. When rotation of the screw shaft 36 is stopped, the movement of the screw shaft 36 is restricted by meshing between the screw shaft 36 and the nut member 31, which restricts the movement of the upper rails 12 relative to the lower rails 11. The position of the seat cushion 3 is thus maintained.

The assembly of the gearbox 50 will now be described. As shown in FIG. 6, the helical gear 66 is inserted from above into the opening of the gear case 54 such that the axis of the helical gear 66 coincides with the central axis of the second bearing surfaces 65. At this time, the shaft portions 66a at the ends of the helical gear 66 are inserted in the second bearing surfaces 65, while flexing the second bearing wall portions 58, 59 outward. The shaft portions 66a are thus supported by the second bearing wall portions 58, 59.

Subsequently, the worm gear 67 is inserted from above into the opening of the gear case 54 such that the axis of the worm gear 67 coincides with the central axis of the first bearing surfaces 62. At this time, the shaft portions 67a at the ends of the worm gear 67 are inserted in the first bearing surfaces 62, while flexing the first bearing wall portions 56, 57 outward. The shaft portions 67a are thus supported by the first bearing wall portions 56, 57. At the same time, the worm gear 67 is meshed with the helical gear 66.

Subsequently, the gear cover 71 is attached from above to the opening of the gear case 54, in which the helical gear 66 and the worm gear 67 are supported. At this time, the guide wall portions 78 are guided to the first distal wall portions 56b, 57b (the guide pieces 61), so that the gear cover 71 is smoothly attached to the gear case 54. The upper ends of the engaging wall portions 82 are engaged with the coupling hooks 64, so that the gear cover 71 is fixed to the gear case 54. As described above, the first holding surfaces 77 support the upper half of the shaft portions 67a at positions inside the first distal wall portions 56b, 57b, and the second holding surfaces 81 hold the upper half of the shaft portions 66a at positions inside the second distal wall portions 58b, 59b.

In this manner, the assembly of the gearbox 50 is completed through the one-way assembly, in which the worm gear 67, the helical gear 66, and the gear cover 71 are sequentially assembled to the gear case 54 from the upper opening. The completed gearbox 50 is fixed to each upper rail 12 with the bracket 51.

The present embodiment as described above has the following advantages.

(1) The gear case 54 integrally has the first bearing wall portions 56, 57, which rotatably support the ends of the worm gear 67 (the shaft portions 67a), and the second bearing wall portions 58, 59, which rotatably support the ends of the helical gear 66 (the shaft portions 66a). Therefore, the positional accuracy of the first bearing wall portions 56, 57 and the second bearing wall portions 58, 59 is easily ensured, and noise is prevented from being generated between the meshed worm gear 67 and helical gear 66.

When assembling the worm gear 67 to the gear case 54, the worm gear 67 is inserted to the open end of the gear case 54, such that the axis of the worm gear 67 is perpendicular to the plane of the first bearing wall portions 56, 57. This allows the ends of the worm gear 67 to be supported by the first bearing wall portions 56, 57, while flexing the first bearing wall portions 56, 57 outward. The worm gear 67 is thus easily assembled. Likewise, when assembling the helical gear 66 to the gear case 54, the helical gear 66 is inserted to the open end of the gear case 54, such that the axis of the helical gear 66 is perpendicular to the plane of the second bearing wall portions 58, 59. This allows the ends of the helical gear 66 to be supported by the second bearing wall portions 58, 59, while flexing the second bearing wall portions 58, 59 outward. The helical gear 66 is thus easily assembled.

(2) The gear cover 71 is attached to the open end of the gear case 54, so that the first bearing wall portions 56, 57 and the second bearing wall portions 58, 59 are prevented from being deformed.

(3) The attachment of the gear cover 71 to the gear case 54 is guided by the guide pieces 61. The gear cover 71 is thus smoothly attached to the gear case 54.

(4) The engagement between the coupling hooks 64 and the engaging wall portions 82 allows the gear case 54 to be engaged to the gear cover 71.

(5) The gear cover 71 easily hold the bracket 51 with the hook claws 83. The completed gearbox 50 (the gear covers 71) is easily fixed to each upper rail 12 with the bracket 51.

(6) Since the position of the bracket 51 is determined by inserting the positioning portion 84 into the attachment hole 51a, the assembly of the gear cover 71 is facilitated.

A description will be given below of a second embodiment of the present invention with reference to the accompanying drawings. The second embodiment has configuration in which the gear housing 53 of the gearbox 50 in the first embodiment is changed. Thus, like or the same reference numerals are given to those components that are like or the same as the corresponding components and detailed explanations are omitted.

Figure 8:
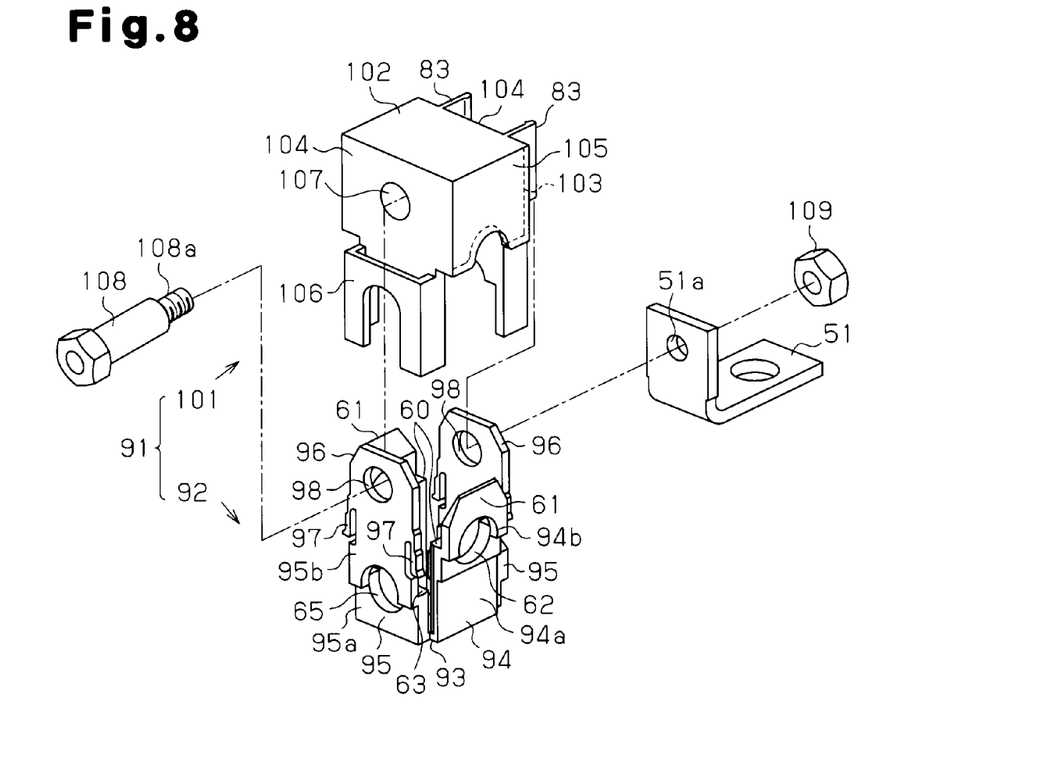
FIG. 8 is an exploded perspective view illustrating a gearbox according to a second embodiment of the present invention.

FIG. 8 is an exploded perspective view illustrating a gear housing 91 according to the present embodiment, which is the outer shell of the gearbox 50. As shown in FIG. 8, the gear housing 91 includes a holding member made of a resin material, which is a gear case 92. The gear case 92 has a rectangular bottom wall portion 93, a pair of first bearing portions, and a second bearing portions. The first bearing portions are first bearing wall portions 94, which extend perpendicularly from the bottom wall portion 93 and face each other in the widthwise direction. The second bearing portions are second bearing wall portions 95, which extend perpendicularly from the bottom wall portion 93 and face each other in the front-rear direction. The gear case 92 is formed like a box with an upper opening by integrating the bottom wall portion 93, and the first and second bearing wall portions 94, 95. The first and the second bearing wall portions 94, 95 are separated from one another while being supported by the bottom wall portion 93 in a cantilever-like manner. The amount by which the first bearing wall portions 94 project from the bottom wall portion 93 is shorter than that of the second bearing wall portions 95, and the direction along which the first bearing wall portions 94 face each other is perpendicular to the direction in which the second bearing wall portions 95 face each other.

The first bearing wall portions 94 include the steps 60, a pair of first proximal wall portions 94a, which are closer to the proximal ends than the steps 60, and a pair of first distal wall portions 94b, which are closer to the distal ends than the steps 60. The space between the first distal wall portions 94b is greater than the space between the first proximal wall portions 94a.

The second bearing wall portions 95 include the steps 63, a pair of second proximal wall portions 95a, which are closer to the proximal ends than the steps 63, and a pair of second distal wall portions 95b, which are closer to the distal ends than the steps 63. The space between the second distal wall portions 95b is greater than the space between the second proximal wall portions 95a. Further, the second distal wall portions 95b include a pair of guide pieces 96 at the distal ends. A pair of hooks, which are a pair of coupling hooks 97, are formed at sides in the widthwise direction (left-right direction) in a center portion of each second distal wall portion 95b in the up-down direction. A through bolt hole 98 is formed in the distal portion of each second distal wall portions 95b along the thickness.

The gear case 92 having this configuration rotatably supports the helical gear 66 and the worm gear 67 as in the case of the first embodiment.

A covering member made of resin, which is a gear cover 101, is attached to the gear case 92 to form the gear housing 91 together with the gear case 92. The gear cover 101 has a rectangular top wall portion 102, a pair of first holding wall portions 103, and a pair of second holding wall portions 104. The first holding wall portions 103 extend perpendicularly from the top wall portion 102 and face each other in the widthwise direction. The second holding wall portions 104 extend perpendicularly from the top wall portion 102 and face each other in the front-rear direction. The gear cover 101 is formed like a lid with a lower opening by integrating the top wall portion 102, and the first and second holding wall portions 103, 104. The amount by which the first holding wall portions 103 project from the top wall portion 102 is shorter than that of the second holding wall portions 104, and the direction along which the first holding wall portions 103 face each other is perpendicular to the direction in which the second holding wall portions 104 face each other.

When the gear cover 101 is attached to the gear case 92, the distal surfaces of the first holding wall portions 103 face the steps 60. In this state, the inner surface of each of the first holding wall portions 103 is flush with the inner surface of the corresponding one of the first proximal wall portions 94a, and the outer surface of each of the first holding wall portions 103 is flush with the inner surface of the corresponding one of the first distal wall portions 94b. The first holding surface 77 (see FIG. 7) is formed in the distal surface of each first holding wall portion 103. Therefore, as in the case of the first embodiment, when the gear cover 101 is attached to the gear case 92, the first holding surfaces 77 rotatably support the upper half of the shaft portions 67a at positions inside the first distal wall portions 94b.

The top wall portion 102 has a pair of perpendicular guide wall portions 105, which extend along the first holding wall portions 103 at positions outside the first holding wall portions 103. By inserting the first distal wall portions 94b (the guide pieces 61) between the guide wall portions 105 and the first holding wall portions 103, the attachment of the gear cover 101 to the gear case 92 is guided.

On the other hand, when the gear cover 101 is attached to the gear case 92, the distal surfaces of the second holding wall portions 104 face the steps 63. In this state, the inner surface of each of the second holding wall portions 104 is flush with the inner surface of the corresponding one of the second proximal wall portions 95a, and the outer surface of each of the second holding wall portions 104 is flush with the inner surface of the corresponding one of the second distal wall portions 95b. Each second holding wall portion 104 has the second holding surface 81 shown in FIG. 7(b). Therefore, as in the case of the first embodiment, when the gear cover 101 is attached to the gear case 92, the second holding surfaces 81 rotatably support the upper half of the shaft portions 66a at positions inside the second distal wall portions 95b.

A pair of engaging portions, which are engaging wall portions 106, are formed at distal ends of the second holding wall portions 104. The engaging wall portions 106 are formed by folding back the second holding wall portions 104 toward each other from the widthwise ends. Each engaging wall portion 106 has a shape that bridges the outer sides of the second holding wall portion 104 along the widthwise direction. The second distal wall portions 95b are inserted between the engaging wall portions 106 and the second holding wall portions 104, so that the coupling hooks 97 are elastically engaged to the inner surfaces of the engaging wall portions 106 in the widthwise direction. As a result, the gear cover 101 is fixed so as not to come off the gear case 92.

At this time, the first distal wall portions 94b are held between the first holding wall portions 103 and the guide wall portions 105, and the second distal wall portions 95b are held between the second holding wall portions 104 and the engaging wall portions 106. Accordingly, the first distal wall portions 94b (the first bearing wall portions 94) are prevented from being deformed along the axis of the worm gear 67, and the second distal wall portions 95b (the second bearing wall portions 95) are prevented from being deformed along the axis of the helical gear 66.

A bolt hole 107 is formed in the proximal portion of each second holding wall portion 104, which extends in the front-rear direction and faces one of the bolt holes 98 when the gear cover 101 is attached to the gear case 92. A fastening bolt 108 is inserted in the bolt holes 107, and the distal portion of the fastening bolt 108 is received by the attachment hole 51a of the bracket 51. A thread portion 108a of the fastening bolt 108 projects rearward from the attachment hole 51a of the bracket 51. The nut 109 is fastened to the thread portion 108a to fix the gear housing 91 to the bracket 51. The fastening bolt 108 and the nut 109 form fastening means.

According to the present embodiment as described above, the following advantage are obtained in addition to the advantages of the items (1) to (5) of the first embodiment.

(7) The gear case 92 and the gear cover 101 are firmly fixed to the bracket 51 by the fastening bolt 108 and the nut 109. Since the bracket 51 is fixed to each upper rail 12, the gearbox 50 is firmly fixed to the upper rail 12 with the bracket 51.

A description will be given below of a third embodiment of the present invention with reference to the accompanying drawings. The third embodiment has configuration in which the gear housing 53 of the gearbox 50 in the first embodiment is changed. Thus, like or the same reference numerals are given to those components other than the gearbox 50 and detailed explanations are omitted.

Figure 9:
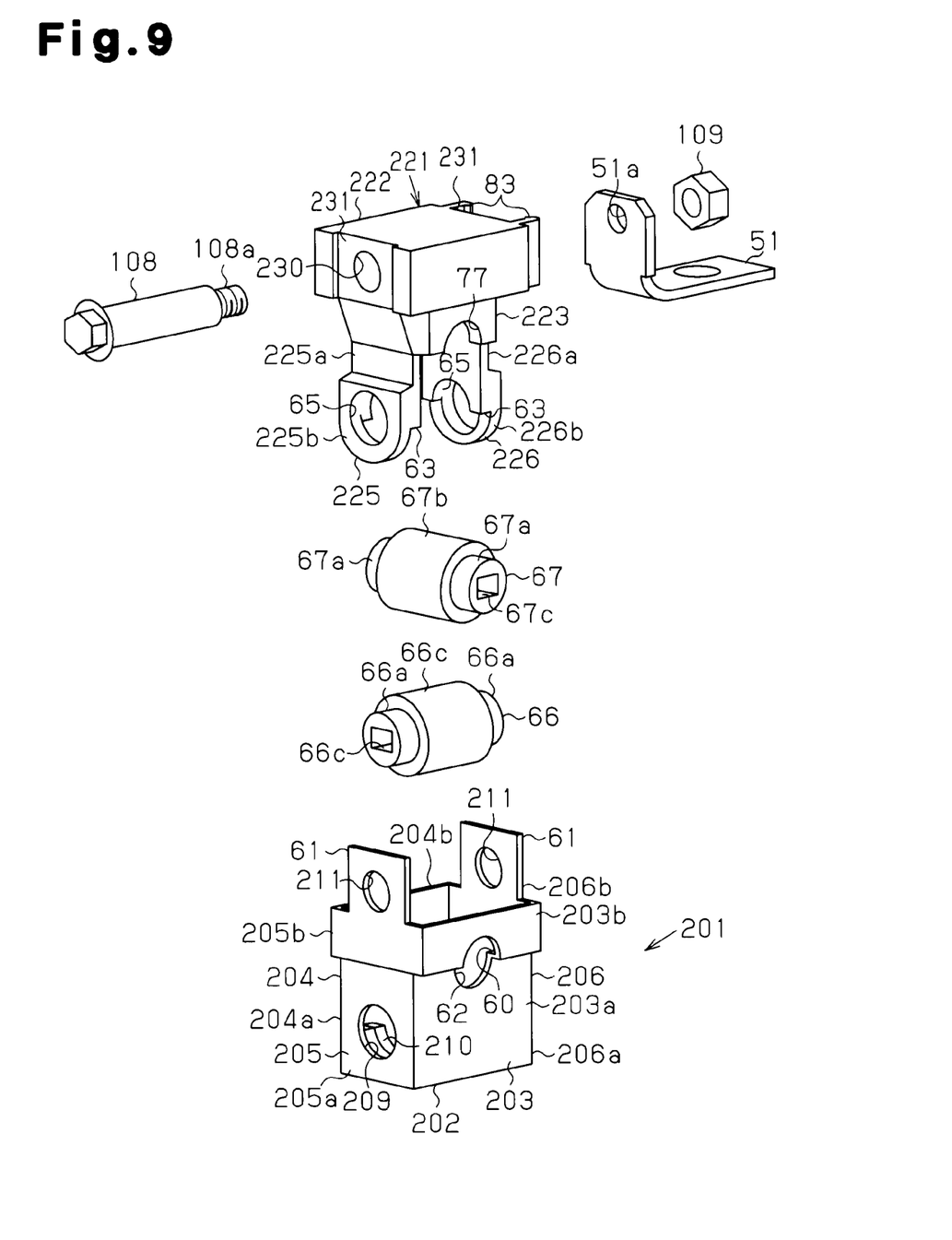
FIG. 9 is an exploded perspective view illustrating a gearbox according to a third embodiment of the present invention.

FIG. 9 is an exploded perspective view illustrating a gear housing 200 according to the present embodiment, which is the outer shell of the gearbox 50. As shown in FIG. 9, the gear housing 200 has a holding member made or a first member made of a resin material, which is a gear case 201. The gear case 201 has a rectangular bottom wall portion 202, a pair of first bearing portions, and a pair of outer wall portions 205, 206. The first bearing portions are first bearing wall portions 203, 204, which extend upward from the bottom wall portion 202 and face each other in the widthwise direction (left-right direction). The outer wall portions 205, 206 extend upward from the bottom wall portion 202 and face each other in the front-rear direction.

The gear case 201 is formed like a box with an upper opening by integrating the bottom wall portion 202, the first bearing wall portions 203, 204, and outer wall portions 205, 206. Each adjacent pair of the first bearing wall portions 203, 204 and the outer wall portions 205, 206 are connected to each other.

The amount by which the first bearing wall portions 203, 204 project from the bottom wall portion 202 is shorter than that of the outer wall portions 205, 206, and the direction along which the first bearing wall portions 203, 204 face each other is perpendicular to the direction in which the outer wall portions 205, 206 face each other.

The first bearing wall portions 203, 204 have the steps 60, first proximal wall portions 203a, 204a closer to the proximal ends than the steps 60, and first distal wall portions 203b, 204b closer to the distal ends than the steps 60. The space between the first distal wall portions 203b, 204b is greater than the space between the first proximal wall portions 203a, 204a. A circular first bearing surface 62 is formed at a position in each of the first bearing wall portions 203, 204 that corresponds to the step 60. The central axis of the first bearing surface 62 coincides with the axis of the drive cables 48 when the gearbox 50 is held by the upper rail 12 with the bracket 51.

Figure 11:
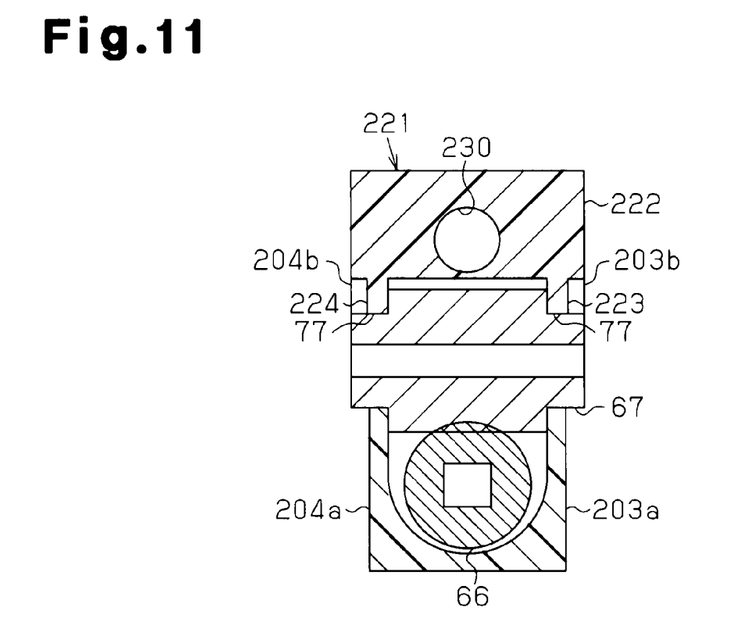
FIG. 11 is a cross-sectional view illustrating the gearbox shown in FIG. 9.

The first bearing wall portions 203, 204 rotatably support a worm gear 67. As shown in FIG. 11, the axial length of the worm gear 67 is equal to the distance between the outer surface of the first distal wall portion 203b and the outer surface of the first distal wall portion 204b. A shaft portion 67a is provided at either end of the worm gear 67. Each shaft portion 67a has an outer diameter equivalent to the inner diameter of the first bearing surfaces 62 and slidably contacts the first bearing surface 62. Therefore, each end surface of the worm gear 67 is flush with the outer surface of the corresponding one of the first distal wall portions 203b, 204b.

The outer wall portions 205, 206 have proximal portions 205a, 206a closer to the proximal end than the steps 60, and distal portions 205b, 206b closer to the distal ends than the steps 60. A pair of circular through holes 209 are formed in the proximal portions 205a, 206a. The central axis of the through holes 209 coincides with the axis of the screw shaft 36 when the gearbox 50 is held by the upper rail 12 with the bracket 51.

A bolt hole 211 is formed in each of the distal portions 205b, 206b along the thickness. Also, a guide piece 61 extends upward from each of the distal portions 205b, 206b.

Figure 10:
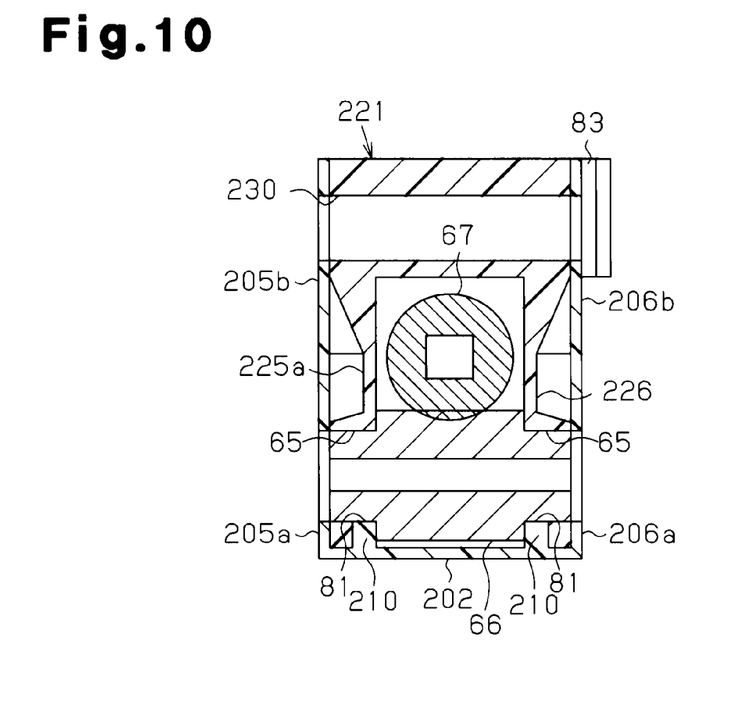
FIG. 10 is a cross-sectional view illustrating the gearbox shown in FIG. 9.

The gear case 201 further includes a pair of second holding wall portions 210 perpendicularly projecting upward from the bottom wall portions 202. As shown in FIG. 10, the second holding wall portions 210 are each positioned at a position spaced from the corresponding one of the outer wall portions 205, 206 by a predetermined distance. A semicircular second holding surface 81 is formed in the distal portion of each second holding wall portion 210. Each second holding surface 81 is aligned with the lower half of the through hole 209 formed in the corresponding one of the outer wall portions 205, 206. The second holding surfaces 81 slide on the shaft portions 67a at the ends of the helical gear 66 so as to rotatably support the helical gear 66.

A covering member made of resin, which is a gear cover 221, is attached to the gear case 201 to form the gear housing 200 together with the gear case 201. The gear cover 221 has a rectangular top wall portion 222, a pair of first holding wall portions 223, 224, and a pair of second bearing wall portions 225, 226. The first holding wall portions 223, 224 extend perpendicularly from the top wall portion 222 and face each other in the widthwise direction (left-right direction). The second bearing wall portions 225, 226 extend perpendicularly from the top wall portion 222 and face each other in the front-rear direction.

The gear cover 221 is formed like a lid with a lower opening by integrating the top wall portion 222, the second holding wall portions 223, 224, and the second bearing wall portions 225, 226. The amount by which the first holding wall portions 223, 224 project from the top wall portion 222 is shorter than that of the second bearing wall portions 225, 226, and the direction along which the first holding wall portions 223, 224 face each other is perpendicular to the direction in which the second bearing wall portions 225, 226 face each other.

As shown in FIG. 11, the inner surface of each of the second holding wall portions 223, 224 is flush with the inner surface of the corresponding one of the first proximal wall portions 203a, 204a, and the outer surface of each of the second holding wall portions 223, 224 is flush with the inner surface of the corresponding one of the first distal wall portions 203b, 204b. A semicircular first holding surface 77 is formed in each of the first holding wall portions 223, 224 at a position that corresponds to the step 60. When the gear cover 221 is attached to the gear case 201, the first holding surfaces 227 rotatably support the upper half of the shaft portions 67a at positions inside the first distal wall portions 203b, 204b. Thus, the shaft portions 67a of the worm gear 67 are rotatably supported over the entire circumference at proximal positions close to the gear portion 67b.

The second bearing wall portions 225, 226 include steps 63 on the inner surface, second proximal wall portions 225a, 226, which are closer to the proximal ends than the steps 63, and second distal wall portions 225b, 226b, which are closer to the distal ends than the steps 63. The steps 63 extend in the widthwise direction (the left-right direction).

A circular second bearing surface 65 is formed at a position of the inner surface of each of the second distal wall portions 225b, 226b that corresponds to the step 63. The central axis of the second bearing surfaces 65 coincides with the axis of the drive cables 48 when the gear cover 221 is attached to the gear case 201. That is, the axis of the second bearing surfaces 65 coincides with center axis of the through holes 209 formed in the outer wall portions 205, 206 of the gear case 201.

As shown in FIG. 10, the inner surface of each of the second proximal wall portions 225a, 226a is flush with the inner surface of the corresponding one of the second holding wall portions 210. The inner surface of each of the second distal wall portions 225b, 226b is flush with the outer surface of the corresponding one of the second holding wall portions 210, and The outer surface of each of the second distal wall portions 225b, 226b is flush with the inner surface of the corresponding one of the outer wall portions 205, 206.

The second bearing wall portions 225, 226 rotatably support a helical gear 66. The axial length of the helical gear 66 is equal to the distance between the outer surface of the second distal wall portion 225b and the outer surface of the second distal wall portion 226b. Therefore, the end surfaces of the helical gear 66 are flush with the outer surface of the second distal wall portion 226b. A shaft portion 66a is provided at either end of the helical gear 66. Each shaft portion 66a has an outer diameter equivalent to the inner diameter of the second bearing surfaces 65 and slidably contacts the second bearing surface 65.

A bolt hole 230 is formed in the top wall portion 222, which extends in the front-rear direction and faces one of the bolt holes 211 when the gear cover 221 is attached to the gear case 201. A fastening bolt 108 is inserted in the bolt holes 211, 230, and the distal portion of the fastening bolt 108 is received by the attachment hole 51a of the bracket 51. A thread portion 108a of the fastening bolt 108 projects rearward from the attachment hole 51a of the bracket 51. The nut 109 is fastened to the thread portion 108a to fix the gear housing 200 to the bracket 51. The fastening bolt 108 and the nut 109 form fastening means.

A recess 231 is formed in the top wall portion 222 at a position corresponding to the guide pieces 61 of the distal portions 205b, 206b when the gear cover 221 is attached to the gear case 201. The length of the recess 231 in the widthwise direction (left-right direction) is substantially equal to the length of the corresponding guide piece 61 in the widthwise direction (left-right direction). The depth of the recess 231 is substantially equal to the thickness of the guide piece 61.

The assembly of the gearbox 50 will now be described.

As shown in FIG. 9, with the worm gear 67 contacting the first holding surfaces 77 of the gear cover 221, the shaft portions 66a of the helical gear 66 are inserted into the second bearing surfaces 65 while flexing the second distal wall portions 225b, 226b outward, so that the shaft portions 66a are supported by the second bearing wall portions 225, 226. In this state, the worm gear 67 is supported by the helical gear 66.

Subsequently, the gear cover 221 is inserted in the gear case 201 while inserting the shaft portions 67a of the worm gear 67 into the first bearing surfaces 62 and flexing the first distal wall portions 203b, 204b outward. At this time, the recesses 231 are guided by the guide pieces 61, so that the gear cover 221 is smoothly attached to the gear case 201.

Accordingly, the worm gear 67 is rotatably supported by the first bearing surfaces 62 and the first holding surfaces 77 over the entire circumference, and the helical gear 66 is rotatably supported by the second bearing surfaces 65 and the second holding surfaces 81 over the entire circumference. As a result, the worm gear 67 is meshed with the helical gear 66 with the axis O1 of the helical gear 66 and the axis O2 of the worm gear 67 forming an angle of approximately 90°.

Thereafter, with the distal portion of the bracket 51 engaged with the hook claws 83 as in the case of the first embodiment, the fastening bolt 108 is passed through the bolt holes 211, 230 and the attachment hole 51a formed in the bracket 51, and the nut 109 is then fastened to the thread portion 108a of the fastening bolt 108.

As described above, the present embodiment has the following advantage.

(8) The gear case 201 integrally has the first bearing wall portions 203, 204, which rotatably support the end portions of the worm gear 67. Also, the gear cover 221 integrally has the second bearing wall portions 225, 226, which rotatably support the end portions of the helical gear 66. Therefore, the positional accuracy of the first bearing wall portions 203, 204 and the second bearing wall portions 225, 226 is easily ensured, and noise is prevented from being generated between the meshed worm gear 67 and helical gear 66.

When assembling the worm gear 67 to the gear case 201, the worm gear 67 is inserted to the open end of the gear case 201, such that the axis of the worm gear 67 is perpendicular to the plane of the first bearing wall portions 203, 204. This allows the ends of the worm gear 67 to be supported by the first bearing wall portions 203, 204, while flexing the first bearing wall portions 203, 204 outward. The worm gear 67 is thus easily assembled. Likewise, when assembling the helical gear 66 to the gear cover 221, the helical gear 66 is inserted, such that the axis of the helical gear 66 is perpendicular to the plane of the second bearing wall portions 225, 226. This allows the ends of the helical gear 66 to be supported by the second bearing wall portions 225, 226. The helical gear 66 is thus easily assembled.

(9) The gear cover 221 is attached to the open end of the gear case 201, so that the first bearing wall portions 203, 204 and the second bearing wall portions 225, 226 are prevented from being deformed.

(10) The gear cover 221 easily hold the bracket 51 with the hook claws 83. The completed gearbox 50 (the gear covers 221) is easily fixed to each upper rail 12 with the bracket 51.

The above embodiments may be modified as follows.

The gearboxes 50 and the peripheral components may be arranged at the rear ends of the upper rails 12.

The gearboxes 50 and the screw shafts 36 may be arranged on the lower rails 11, and the nut member 31 may be arranged on the upper rails 12.

The present invention may be applied to a vehicle seat 1 in which the position of the seat cushion 3 can be adjustable in a direction other than the front-rear direction (for example, in the left-right direction).

The outer diameters of the helical gear 66 and the worm gear 67 may be adjusted when necessary in accordance with the rotation transfer ratio (constant speed, deceleration, acceleration) from the drive shaft (drive cables 48) to the driven shaft (screw shaft 36).

As long as each of the gear cases 54, 92, 201 has a predetermined flexure, the gear cases 54, 92, 201 may be made of any material, such as metal.

The first holding wall portions 73, 74, 103 may have coupling hooks 64, 97, and the second bearing wall portions 58, 59, 95 may have engaging wall portions 82, 106.

In the illustrated embodiments, the helical gear 66 and the worm gear 67 are meshed with each other with the axis O1 of the helical gear 66 and the axis O2 of the worm gear 67 being perpendicular to each other when viewed from above. However, the helical gear 66 and the worm gear 67 are meshed with each other with the axis O1 of the helical gear 66 and the axis O2 of the worm gear 67 defining a predetermined angle when viewed from above.

In the third embodiment, the gear case 201 corresponds to the first member recited in the CLAIMS section, and the gear cover 221 corresponds to the second member recited in the CLAIMS section. However, the gear case 201 may function as a second member, and the gear cover 221 may function as the first member.

The invention claimed is:

1. A transmission device that transmits rotation of a drive shaft to a driven shaft that has an axis extending along a direction different from the axis of the drive shaft, the device comprising:
    a worm gear attached to the drive shaft;
    a helical gear attached to the driven shaft;
    a holding member that has an opening on one side so as to accommodate the worm gear and the helical gear;
    a pair of first bearing portions integrally formed with the holding member so as to face each other along the axial direction of the drive shaft, the first bearing portions rotatably supporting both ends of the worm gear;
    a pair of second bearing portions integrally formed with the holding member so as to face each other along the axial direction of the driven shaft, the second bearing portions rotatably supporting both ends of the helical gear;
    a covering member that is attached to the holding member from the one side of the holding member thereby covering the opening of the holding member; and
    guide pieces that are formed on at least one of the pair of first bearing portions and the pair of second bearing portions,
    wherein the guide pieces guide the attachment of the covering member to the holding member, and
    wherein the first bearing portions each have a circular first bearing surface, which is in sliding contact with one of the ends of the worm gear, and the second bearing portions each have a circular second bearing surface, which is in sliding contact with one of the ends of the helical gear.

2. The transmission device according to claim 1,
    wherein the worm gear has such a length along the axial direction that each axial end surface of the worm gear is flush with an outer surface of the corresponding first bearing portion,
    wherein the worm gear is inserted into the holding member through the opening of the holding member while flexing the first bearing portions, so that both the ends of the worm gear are supported by the first bearing portions, and
    wherein the helical gear has such a length along the axial direction that each axial end surface of the helical gear is flush with an outer surface of the corresponding second bearing portion, and
    wherein the helical gear is inserted into the holding member through the opening of the holding member while flexing the second bearing portions, so that the ends of the helical gear are supported by the second bearing portions.

3. The transmission device according to claim 1,
    wherein the first bearing portions each have a step at a position corresponding to the first bearing surface,
    wherein the second bearing portions each have a step at a position corresponding to the second bearing surface,
    wherein the covering member has a pair of first holding wall portions each facing one of the steps of the first bearing portions, and a pair of second holding wall portions each facing one of the steps of the second bearing portions,
    wherein the first holding wall portions each have a first holding surface rotatably holding one of the ends of the worm gear, and
    wherein the second holding wall portions each have a second holding surface rotatably holding one of the ends of the helical gear.

4. The transmission device according to claim 1, wherein one of the holding member and the covering member has a hook, and the other has an engaging portion with which the hook is engaged.

5. The transmission device according to claim 1, wherein the covering member includes a hook claw holding a bracket made of a plate.

6. The transmission device according to claim 5, wherein the covering member includes a projection that is inserted in a recess formed in the bracket so as to determine the position of the bracket.

7. The transmission device according to claim 5, further comprising fastening means that is passed through the bracket as well as through the holding member and the covering member, thereby fixing the bracket to the covering member.

8. The transmission device according to claim 1, wherein the guide piece is formed by reducing the thickness of at least one of the first bearing portion and the second bearing portion toward the distal end.

9. The transmission device according to claim 1, wherein each circular first bearing surface rotatably supports one of the ends of the worm gear over the entire circumference, and each circular second bearing surface rotatably supports one of the ends of the helical gear over the entire circumference.

10. The transmission device according to claim 1, wherein each circular first bearing surface is an inner circumferential surface of a hole formed in the corresponding first bearing portion and extending in a circumferential direction over an angle of 360°, and each circular second bearing surface is an inner circumferential surface of a hole formed in the corresponding second bearing portion and extending in a circumferential direction over an angle of 360°.

11. A transmission device that transmits rotation of a drive shaft to a driven shaft that has an axis extending along a direction different from the axis of the drive shaft, the device comprising:
    a worm gear attached to the drive shaft;
    a helical gear attached to the driven shaft;

a holding member that has an opening on one side so as to accommodate the worm gear and the helical gear;

a covering member that is attached to the holding member from the one side of the holding member thereby covering the opening of the holding member;

a pair of first bearing portions integrally formed with a first member, which is one of the holding member and the covering member, wherein the first bearing portions face each other along the axial direction of the drive shaft, and rotatably support both ends of the worm gear;

a pair of second bearing portions integrally formed with a second member, which is the other one of the holding member and the covering member, wherein the second bearing portions face each other along the axial direction of the driven shaft, and rotatably support both ends of the helical gear; and guide pieces that are formed on at least one of the pair of first bearing portions and the pair of second bearing portions, wherein the guide pieces guide the attachment of the covering member to the holding member, and wherein the first bearing portions each have a circular first bearing surface, which is in sliding contact with one of the ends of the worm gear, and the second bearing portions each have a circular second bearing surface, which is in sliding contact with one of the ends of the helical gear.

12. The transmission device according to claim 11,
wherein the worm gear has such a length along the axial direction that each axial end surface of the worm gear is flush with an outer surface of the corresponding first bearing portion, wherein the worm gear is inserted between the first bearing portions while flexing the first bearing portions, so that the ends of the worm gear are supported by the first bearing portions, and wherein the helical gear has such a length along the axial direction that each axial end surface of the helical gear is flush with an outer surface of the corresponding second bearing portion, and wherein the helical gear is inserted between the second bearing portions while flexing the second bearing portions, so that the ends of the helical gear are supported by the second bearing portions.

13. The transmission device according to claim 11,
wherein the first bearing portions each have a step at a position corresponding to the first bearing surface, wherein the second bearing portions each have a step corresponding to a position at the second bearing surface, wherein the second member includes a pair of first holding wall portions each facing the step of one of the first bearing portions, wherein the first holding wall portions each have a first holding surface rotatably holding one of the ends of the worm gear, and wherein the first member includes a pair of second holding wall portions each facing the step of one of the second bearing portions, wherein the second holding wall portions each have a second holding surface rotatably holding one of the ends of the helical gear.

14. The transmission device according to claim 13, wherein the first member is the holding member, and the second member is the covering member.

15. A power seat slide device for a vehicle, comprising:
a first rail fixed to the floor of the vehicle;
a second rail supported to be slidable on the first rail;
a screw shaft that is supported by one of the first and second rails to be rotatable and immovable in the axial direction, the screw shaft having an axis extending along a sliding direction of the second rail;
a nut member fixed to the other one of the first and second rails, the nut member being threaded to the screw shaft;
a drive shaft having an axis that extends in a direction different from the direction of the axis of the screw shaft;
a transmission device supported on one of the first and second rails that supports the screw shaft, the transmission device transmitting rotation of the drive shaft to the screw shaft, wherein the transmission device includes:
a worm gear attached to the drive shaft;
a helical gear attached to the screw shaft, the helical gear being meshed with the worm gear;
a holding member that has an opening on one side so as to accommodate the worm gear and the helical gear;
a covering member that is attached to the holding member from the one side of the holding member thereby covering the opening of the holding member;
a pair of first bearing portions integrally formed with the holding member so as to face each other along the axial direction of the drive shaft, the first bearing portions rotatably supporting both ends of the worm gear;
a pair of second bearing portions integrally formed with one of the holding member and the covering member so as to face each other along the axial direction of the screw shaft, the second bearing portions rotatably supporting both ends of the helical gear; and
guide pieces that are formed on at least one of the pair of first bearing portions and the pair of second bearing portions,
wherein the guide pieces guide the attachment of the covering member to the holding member, and
wherein the first bearing portions each have a circular first bearing surface, which is in sliding contact with one of the ends of the worm gear, and the second bearing portions each have a circular second bearing surface, which is in sliding contact with one of the ends of the helical gear.

16. The power seat slide device according to claim 15, wherein the guide piece is formed by reducing the thickness of at least one of the first bearing portion and the second bearing portion toward the distal end.

* * * * *